(12) United States Patent
Hick et al.

(10) Patent No.: US 6,745,884 B2
(45) Date of Patent: Jun. 8, 2004

(54) HOUSING ARRANGEMENT FOR A FRICTION CLUTCH

(75) Inventors: Wolfram Hick, Schwanfeld (DE); Frank Hirschmann, Niederwerrn (DE); Klaus Steinel, Bergrheinfeld (DE); Erwin Ziegler, Gressthal (DE); Reinhold Weidinger, Unterspiesheim (DE); Norbert Lohaus, Schweinfurt (DE); Joachim Lindner, Dittelbrunn (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/261,346

(22) Filed: Sep. 30, 2002

(65) Prior Publication Data

US 2003/0062235 A1 Apr. 3, 2003

(30) Foreign Application Priority Data

Oct. 1, 2001 (DE) .......................... 101 48 428

(51) Int. Cl.⁷ .............................................. F16D 13/72
(52) U.S. Cl. ................................ 192/70.12; 192/113.24
(58) Field of Search ........................... 192/70.12, 113.2, 192/113.23, 113.24

(56) References Cited

U.S. PATENT DOCUMENTS

| | | | |
|---|---|---|---|
| 4,657,128 A | * 4/1987 | Fujito et al. ............ | 192/113.24 |
| 4,890,708 A | * 1/1990 | Kitano et al. ............... | 192/70.3 |
| D335,290 S | 5/1993 | Flotow ........................... | D15/5 |
| 5,845,757 A | * 12/1998 | Csonka .................. | 192/105 BA |

FOREIGN PATENT DOCUMENTS

JP        03219118 A    *  9/1991    ........... F16D/13/71

* cited by examiner

Primary Examiner—Richard M. Lorence
(74) Attorney, Agent, or Firm—Cohen, Pontani, Lieberman & Pavane

(57) ABSTRACT

A housing arrangement for a friction clutch, especially for a multi-disk clutch, where the housing arrangement is designed approximately in the shape of a cup and is provided with a bottom area and an edge area for connection to a flywheel. At least one air through-opening is provided in the bottom area, each opening being bounded by a front edge and a rear edge with respect to the direction of rotation, the front edge being axially offset toward the interior of the housing with respect to said rear edge.

12 Claims, 4 Drawing Sheets

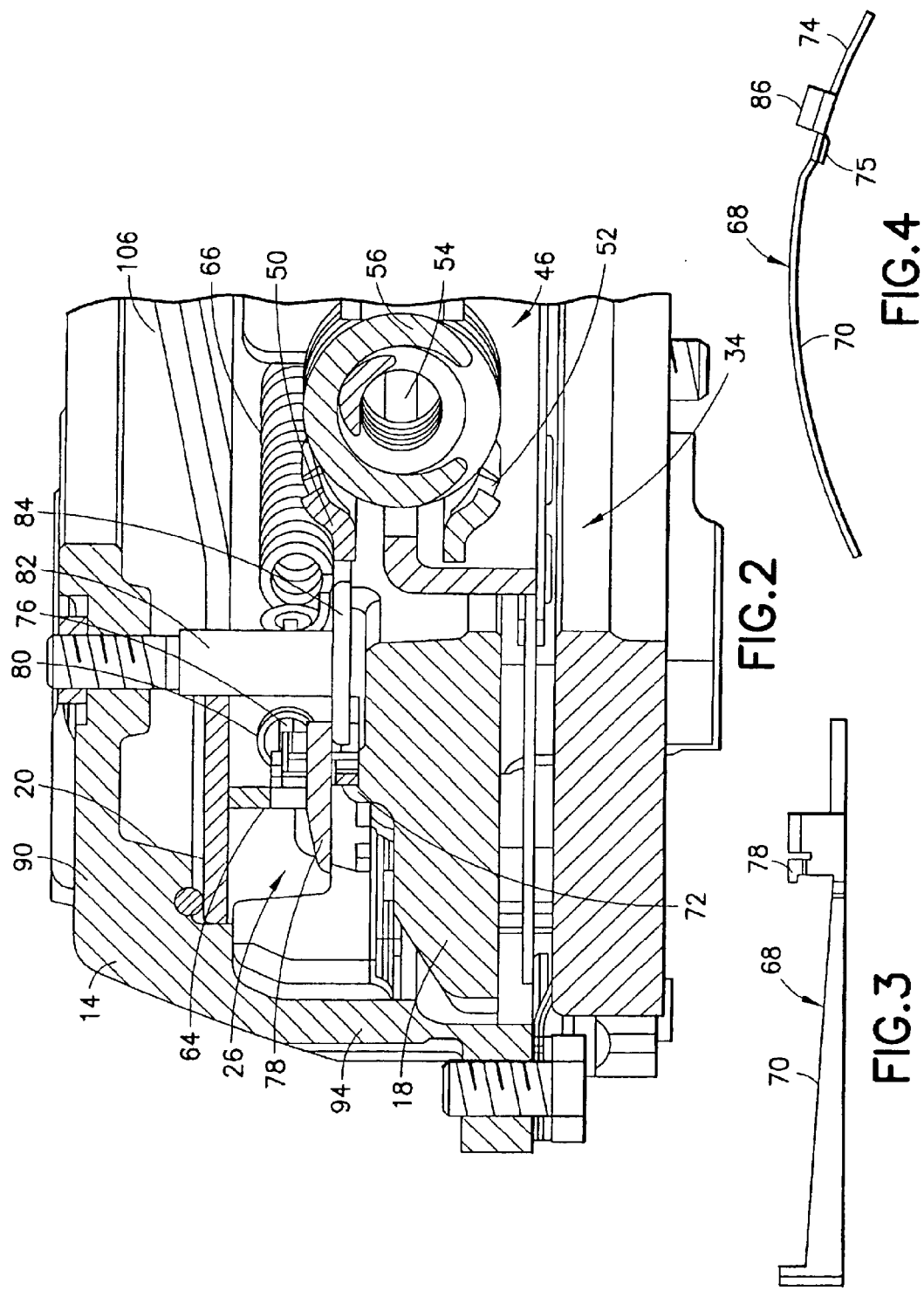

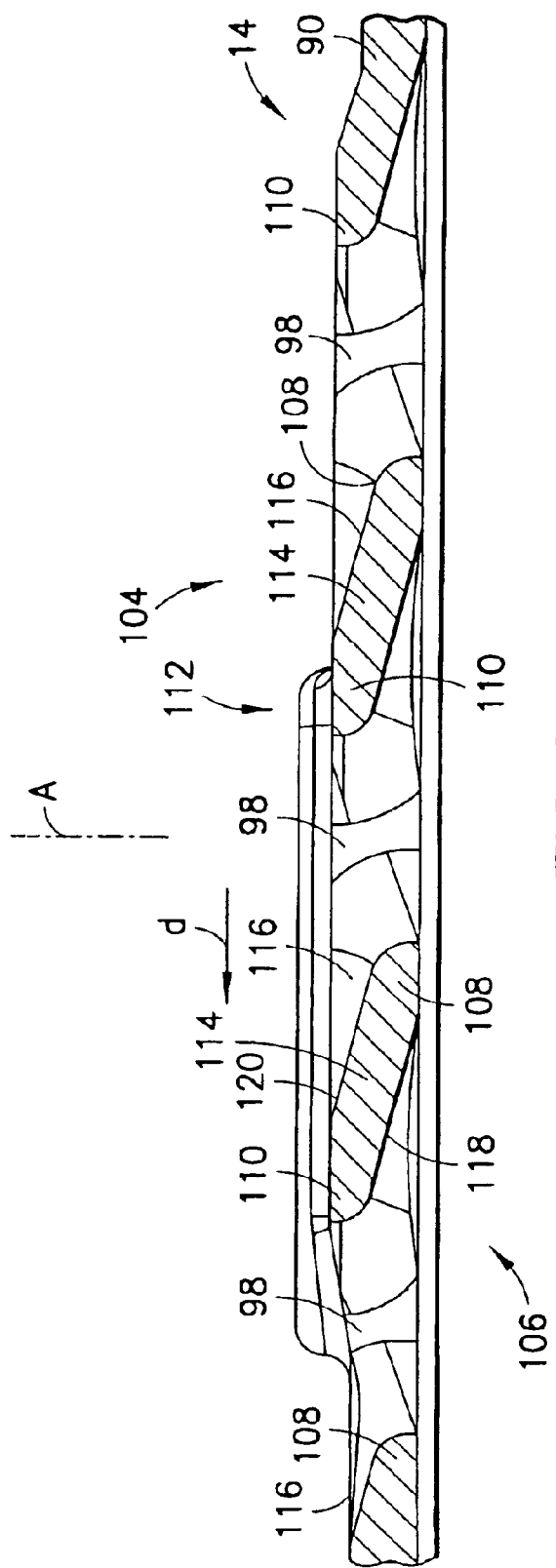

HOUSING ARRANGEMENT FOR A FRICTION CLUTCH

BACKGROUND OF THE INVENTION

1. Field of the Invention

The present invention pertains to a housing arrangement for a friction clutch, especially for a multi-disk clutch, where the housing arrangement is designed in the approximate shape of a cup with a bottom area and an edge area intended for connection to a flywheel arrangement, and where at least one air through-opening is provided in the bottom area.

2. Description of the Related Art

A housing arrangement of this type is known from U.S. Pat. No. Des. 335,290. This known housing arrangement is designed essentially in the form of a cup and has several openings in the edge area, through which fastening screws can be inserted and screwed to a flywheel or the like. In the bottom area of the housing arrangement, several openings are provided, through which air can enter the interior of a friction clutch equipped with this type of housing arrangement.

SUMMARY OF THE INVENTION

It is the object of the present invention to provide a housing arrangement for a friction clutch which results in a friction clutch with improved operating characteristics.

According to the present invention, this object is achieved by a housing arrangement for a friction clutch, especially for a multi-disk clutch, where the housing arrangement is designed approximately in the shape of a cup and is provided with a bottom area and with an edge area intended for connection to a flywheel arrangement, and where at least one air through-opening is provided in the bottom area.

It is also provided in accordance with the invention that an edge area which forms the boundary at the front, with respect to an operating direction, of the minimum of one air through-opening is offset toward the interior of the housing with respect to an edge area which forms the boundary at the rear, with respect to an operating direction, of the minimum of one air through-opening.

As a result of the offset of the two edge areas forming the front and rear boundaries of the air through-opening in the manner according to the invention, it is ensured that, during rotational operation of the clutch, air is forced by a turbine-like effect into the interior space enclosed by the housing arrangement. The components present in the interior of the friction clutch, which are exposed to severe thermal loads as a result of friction, are therefore cooled more effectively.

To facilitate the entry of air into the interior of the housing, in the area of the front edge, the exterior surface of the bottom area of the housing arrangement slopes down toward the air through-opening and also toward the interior of the housing. As a result of this downslope of the exterior surface of the housing arrangement toward the air through-opening, a negative pressure is produced during rotational operation, which induces a suction effect.

The inward-flow action can be improved by allowing the interior surface of the bottom area of the housing arrangement in the area of the rear edge to slope upward toward the air through-opening and toward the exterior of the housing.

So that an essentially uniform distribution of the air inflow can be ensured, it is proposed that a plurality of air through-openings be provided in a row in the circumferential direction around an axis of rotation. Several groups of air through-openings can be provided.

The housing arrangement according to the invention can, for example, be produced by a casting process. In this case it is preferable for the housing arrangement to be out of balance before it is assembled with other components. When a pressure plate assembly or a friction clutch is fully assembled, several components are attached to various points on the circumference of the housing arrangement; these components do not necessarily find opposing bodies at some other point on the circumference to correct the imbalance. This is usually compensated by the attachment of additional balancing weights. By taking the approach according to the invention and installing air through-openings in the housing arrangement, it is possible, by taking appropriate design measures, to ensure that, first, the housing arrangement is not balanced in and of itself, and that, second, after the other components have been added, an assembly is obtained which has no imbalance in and of itself with the exception of those resulting from manufacturing tolerances.

In addition, it is possible in the housing arrangement according to the invention for an edge area forming the rear boundary, in the operating direction, of the leading air through-opening and the edge area forming the front boundary, in the operating direction, of the trailing air through-opening to be formed on a web area separating the two air through-openings from each other and for a surface of the web area facing the interior of the housing and/or a surface of the web area facing the exterior of the housing to be slanted with respect to a plane orthogonal to an axis of rotation.

The present invention also pertains to a friction clutch which comprises a housing arrangement according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 2 shows a partial longitudinal section through a pressure plate assembly of the friction clutch shown in FIG. 1;

FIG. 3 shows a side view of a slider used in the friction clutch illustrated in FIG. 1;

FIG. 4 shows a top view of the slider shown in FIG. 3;

FIG. 6 shows a circumferential section through the housing illustrated in FIG. 5, cut along the line VI—VI in FIG. 5.

DETAILED DESCRIPTION OF THE PRESENTLY PREFERRED EMBODIMENTS

Figure 1:
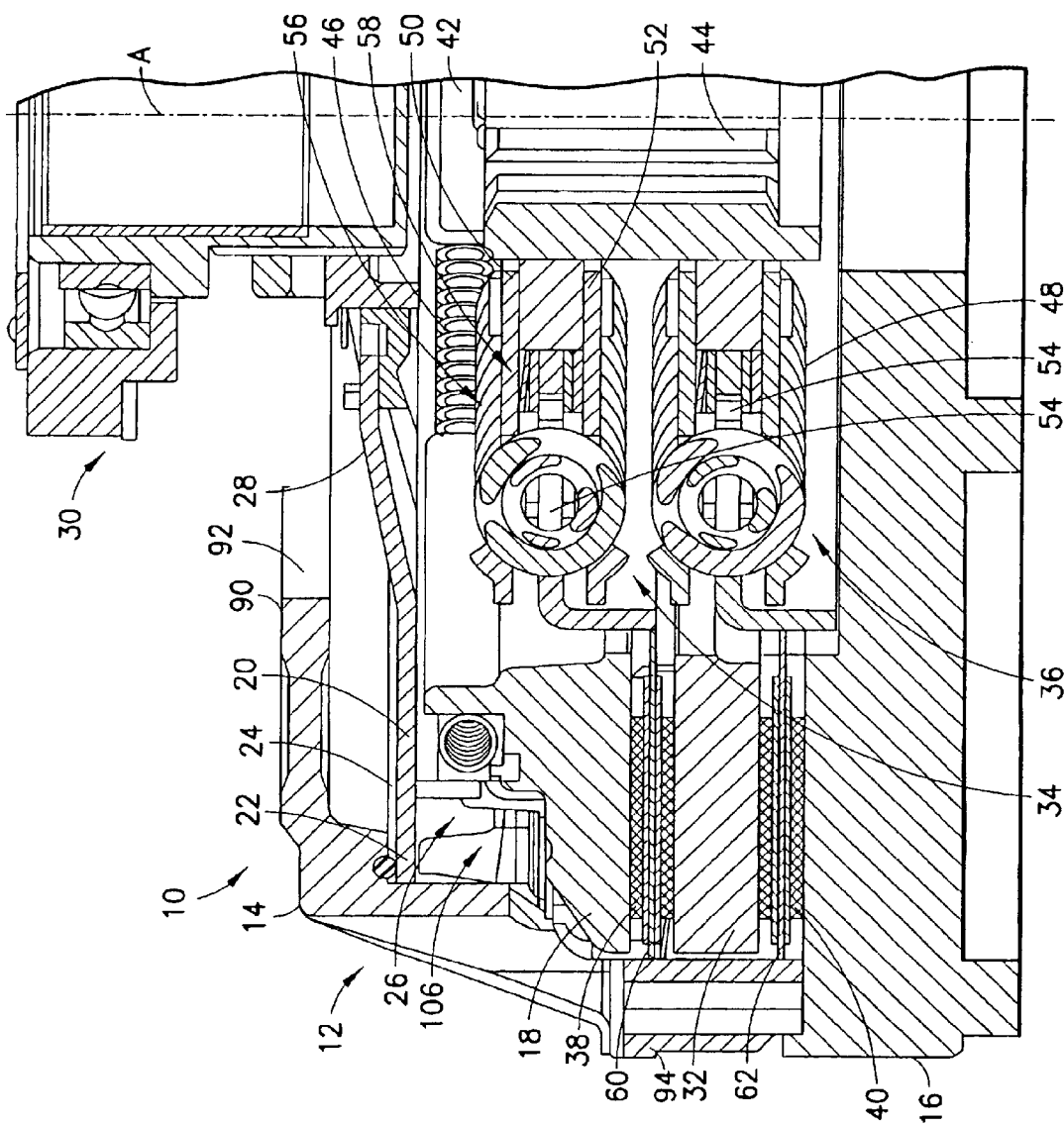
FIG. 1 shows a partial longitudinal section through a multi-disk friction clutch.

The essential aspects of the design and function of a friction clutch in which the present invention can be realized are described with reference to FIGS. 1–4.

The friction clutch 10 comprises a pressure plate assembly 12, which is or can be rigidly connected to a flywheel 16 in the radially outer area of the housing 14. The flywheel 16 can be designed as single mass, but it can also be designed as a multi-mass flywheel. In the radially inner area, the flywheel 16 is designed so that it can be connected nonrotatably to a drive shaft, such as to the crankshaft of an internal combustion engine.

The pressure plate assembly 12 also includes a pressure plate 18, which is connected in an essentially nonrotatable manner by, for example, a plurality of tangential leaf springs or the like, to the housing 14, but is able to shift position with respect to the housing 14 within a limited axial range in the direction of an axis of rotation A. The radially outer area 22 of a stored-energy device 20, which can be designed as a diaphragm spring, is supported on the housing 14, whereas the area 24 farther inward in the radial direction acts on the pressure plate 18 by way of a wear-compensating device 26, to be described in greater detail further below. A release mechanism 30 for executing disengaging processes of the pull type acts on the spring tongues 28 located radially on the inside.

The pressure plate assembly 12 also includes an intermediate plate 32, which is also connected to the housing 14 with freedom to move within a certain axial range but without any freedom to rotate relative to the housing.

The pressure plate assembly 12, i.e., the friction clutch 10, comprises in addition two clutch disks 34 and 36. Each of these clutch disks has a friction lining 38, 40 in the radially outer area, and in the radially inner area they have a hub 42, the wedge-like teeth 44 or the like of which can be positioned nonrotatably on a power takeoff shaft, such as the input shaft to a transmission.

Each of the two clutch disks 34, 36 also has a torsional vibration damping arrangement 46, 48. The two torsional vibration damping arrangements 46, 48 are both designed in the same way in the example presented here and comprise, as will be described below on the basis of the clutch disk 34 in the following, two cover disk elements 50, 52, which are connected in the radially inner area to the hub 42 for rotation in common, either directly or via an additional predamper stage. Here, for example, the two cover disk elements 50, 52 can have sets of internal teeth which mesh with corresponding external teeth on the hub 42. Axially between the two cover disk elements 50, 52 is a central disk element 54. Both the cover disk elements 50, 52 and the central disk element 54 have spring windows with control edges in the circumferential direction, on each of which the end of damper spring 56 is supported in the circumferential direction. Several damper springs 56 in a row in the circumferential direction or groups of damper springs 56, nested radially inside each other, for example, can be provided as generally known in and of itself for torsional vibration damper arrangements normally provided for clutch disks. Because of the presence of the damper springs 56, a limited circumferential mobility of the central disk element 54 with respect to the associated cover disk elements 50, 52 is made possible. Here, in a manner known in and of itself, a stop for limiting rotational movement can be provided to prevent the damper springs 56 from being "set on block". In addition, a dry friction device 58 can be provided to contribute, by Coulomb friction, to the vibration damping above and beyond the damping effect provided by compression of the springs. As already explained, it is obviously possible to design the torsional vibration damping arrangements 46, 48 with several stages, such as through the provision of an additional set of cover disk elements axially farther toward the outside and an associated set of springs, which can then act between the cover disk elements 50, 52 and these additional cover disk elements.

The central disk elements 54 of the two clutch disks 34, 36 carry in their radially outer area disk-like friction lining carriers 60, 62, which again carry the friction linings 38, 40 via associated leaf springs or the like or can themselves be the spring linings.

In the engaged state, the stored-energy device 20 presses down via the previously mentioned wear-compensating device 26 on the pressure plate 18. This presses the friction linings 38 of the clutch disk 34 against the intermediate plate 32. The clutch disk 36 with its friction linings 40 can then be clamped between the intermediate plate 32 and the flywheel 16. As a result of this friction-locking connection, therefore, a nonrotatable connection is established between the pressure plate 18, the intermediate plate 32, and the flywheel 16 on the one side and the two clutch disks 34, 36 or the common hub 42 of the disks on the other. For the transition to the disengaged state, a pulling force is exerted on the spring tongues 28 of the stored-energy device 20. This moves area 24 of the device axially away from the flywheel 16, and the device thus releases at least some the force it is exerting on the pressure plate 18. Under the action of the previously mentioned tangential leaf springs or the like, the pressure plate 18 and the intermediate plate 32 are then also moved axially away from the flywheel 16, so that, by the release of the clamping action, the two clutch disks 34, 36 are also released.

In the following, the design and function of the wear-compensating device 26 is described with reference to FIGS. 2–4.

The wear-compensating device 26 also includes a wedge-like, curved slider 68, the curvature of which conforms to the curved contour of the adjusting ring 64; a longitudinal section 70 of the slider rests against an inner circumferential area of an axial shoulder 72 on the pressure plate 18. The slider 68 is designed basically for sliding in the circumferential direction. One end of a leaf-like arresting element 76 is fixed in place at one end on the pressure plate 18; the other circumferential end 78 of the arresting element extends over the wedge-like elongated area 70 of the wedge-like slider 68. As a result of the leaf spring-like design, the arresting element 76 presses on the slider 68 and thus pushes it against the pressure plate 18. One end of another pretensioning spring 80 is hooked onto a hook section 75 of the slider 68, whereas the other end is hooked onto the end of spring 66 by which spring 66 is hooked onto the adjusting ring 64. As a result of the pretensioning spring 80, the slider 68 is induced to slide in one circumferential direction, this being the direction in which the increasingly larger axial dimension of the slider tries to fill up the area between the pressure plate 18 and the end area 78 of the arresting element 76. The arresting element 76, however, the end area 78 of which is pretensioned against the pressure plate 18, basically prevents the slider 68 from executing this type of sliding movement in the circumferential direction.

The wear-compensating device 26 also includes a wedge-like, curved slider 68, the curvature of which conforms to the curved contour of the adjusting ring 64; a longitudinal section 70 of the slider rests against an inner circumferential area of an axial shoulder 72 on the pressure plate 18. The slider 68 is designed basically for sliding in the circumferential direction. One end of a leaf-like arresting element 76 is fixed in place at one end on the pressure plate 18; the other circumferential end 78 of the arresting element extends over the wedge-like elongated area 70 of the wedge-like slider 68. As a result of the leaf spring-like design, the arresting element 76 presses on the slider 68 and thus pushes it against the pressure plate 18. One end of another pretensioning spring 80 is hooked onto a hook section 78 of the slider 68, whereas the other end is hooked onto the end of spring 66 by which spring 66 is hooked onto the adjusting ring 64. As a result of the pretensioning spring 80, the slider 68 is induced to slide in one circumferential direction, this being the direction in which the increasingly larger axial dimension of the slider tries to fill up the area between the pressure plate 18 and the end area 78 of the arresting element 76. The arresting element 76, however, the end area 78 of which is pretensioned against the pressure plate 18, basically prevents the slider 68 from executing this type of sliding movement in the circumferential direction.

It can be seen especially clearly in FIG. 4 that the slider 68 has a blocking section 86, which is bent outward in the radial direction. This blocking section 86 extends radially outward to engage in an associated circumferential opening in the adjusting ring 64; this circumferential opening, which cannot be seen in the figures, has a larger circumferential dimension than the blocking section 86. This therefore means that the blocking section 86 has a certain limited freedom to move circumferentially in this circumferential opening of the adjusting ring 64.

There is a stop element 82 on the housing 14, also radially inside the adjusting ring 64 and near the end area 78 of the arresting element 76. This stop can be designed as a threaded bolt, which is screwed into a corresponding threaded hole in the housing 14, and which has a mushroom-like head. The head 84 grips under the arresting element 76, that is, it projects into the space formed between the arresting element 76 and the pressure plate 18.

The way in which the wear-compensating device 26 functions upon the occurrence of wear, that is, upon abrasion of the friction linings 38, 40, will be described.

The friction linings 38, 40 are subjected to heavy stress, especially during the execution of clutch-engaging operations, so that abrasion occurs primarily under these conditions. Abrasion of the friction linings 38, 40 of the two clutch disks 34, 36, however, has the result that the intermediate plate 32 and the pressure plate 18 are moved closer to the flywheel 16. The stored-energy device 20 basically follows along after this movement by changing its installation position correspondingly when in the engaged state. Once the wear reaches a certain point, the end area 78 of the arresting element 76 arrives in contact with the stop element 82, i.e., with the mushroom-shaped head 84 of this element. As the amount of wear becomes even greater, the previously described displacement of the pressure plate 18 toward the flywheel 16 has the result that the end area 78 of the arresting element 76 remains hanging on the stop element 82, which means that this end area 78 can no longer follow along after the displacement of the pressure plate 18. The intermediate space formed between the arresting element 76 and the pressure plate 18, which space is filled up by the wedge-like section 70 of the slider 68, thus becomes larger. This enlargement allows the slider 68 to move slightly in the circumferential direction. The displacement of the slider 68 in the circumferential direction thus ultimately corresponds to the amount of wear, and is possible in particular because the blocking section 86 has a certain circumferential play in the previously mentioned opening in the adjusting ring 64. Upon the occurrence of wear, therefore, first only a certain part of the arresting element 76 will be able to move axially with respect to the pressure plate 18, and in correspondence with that, the slider 68 will also move to a certain extent in the circumferential direction. The pretensioning spring 80 thus relaxes slightly. Because, in the engaged state, the adjusting ring 64 is acted on by the diaphragm spring, i.e., by the stored-energy device 20, this ring will not at first be able to rotate circumferentially with respect to the pressure plate 18. Only upon the performance of a release operation, that is, after the diaphragm spring 20 releases its comparatively strong force as a result of the above-mentioned pulling action and the contact force of the adjusting ring 64 on the stored-energy device 20 is defined essentially only by the previously mentioned tangential leaf springs, which also provide the release force, the adjusting ring 64 can, under the preloading effect of the pretensioning spring 66, move slightly in the circumferential direction until one of the circumferential ends of the opening in it makes contact with the blocking section 86. Because the circumferential movement of the slider 68 already corresponds with the wear which has occurred, the rotational movement of the adjusting ring 64, which becomes possible upon execution of a release operation, also corresponds to the wear which has occurred. Upon this rotational movement, the pretensioning spring 66 relaxes slightly, but simultaneously the pretensioning spring 80 is tensioned again somewhat more strongly. The result of this is that the pretensioning force applied by the spring 66 must be greater than the pretensioning force applied by the spring 80.

As a result of the rotation of the adjusting ring 64, which, upon occurrence of wear, becomes possible in the disengaged state, this ring will, as already mentioned, become displaced axially with respect to the pressure plate 18. The entire assembly clamped axially between the stored-energy device 20 and the flywheel 16, comprising the adjusting ring 64, the pressure plate 18, the clutch disk 34 in the area of its friction linings 38, the intermediate plate 32, and the clutch disk 36 in the area of its friction linings 40, thus retains an approximately constant axial dimension regardless of the amount of wear which has occurred. As a result, the stored-energy device 20 also retains approximately the same installed position. It should be pointed out here that, depending on the degree of inclination of the elongated, wedge-like area 70 of the slider 68, for example, the degree of compensation can be increased or decreased. It should also be pointed out that several of these sliders 68 and their associated arresting elements 76 or stop elements 82 can obviously be distributed around the circumference, although, to implement the previously described wear compensation, a single such slider is sufficient.

It can be seen especially in FIG. 1 that the housing 14 has an approximately cup-like design. The stored-energy device 20 is supported in the axial direction on a bottom area 90. This bottom area 90 has a central opening 92, through which the release mechanism 30 has access to the spring tongues 28 of the stored-energy device 20. In the radially outer area, the housing 14 has an approximately cylindrical edge area 94, which extends approximately in the axial direction away from the bottom area 90 toward the flywheel 16. At its axially free end area, the edge area 94 is designed so that it can be connected to the flywheel 16. For this purpose it is possible to provide, for example, several radially outward-projecting flange sections 96.

Figure 5:
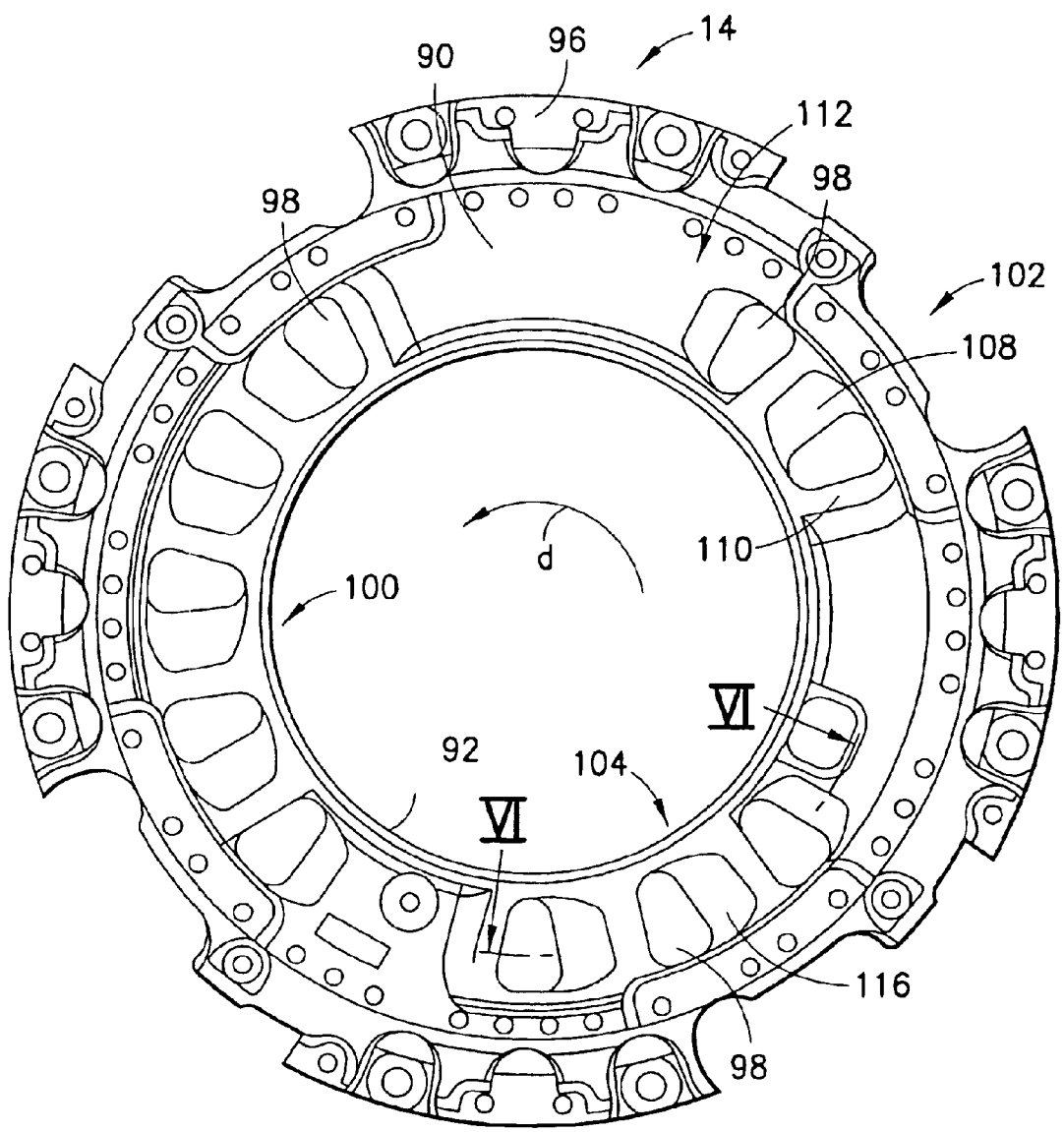
FIG. 5 shows an axial view of the housing of the friction clutch shown in FIG. 1, seen from the outside.

It can also be seen in FIG. 5 that, in the housing 14, especially in the bottom area 90 of the housing, a plurality of circumferentially closed air through-openings 98 is provided. In particular, three groups 100, 102, and 104 of air through-openings 98 arranged in a row in the circumferential direction are provided, where, within the individual groups 100, 102, 104, the space between adjacent air through-openings 98 is smaller than the space between one group 100, 102, 104 and the other.

The air through-openings have essentially the function of ensuring that, in rotational operation, air is conveyed into the interior 106 of the friction clutch 10 to improve the dissipation of heat to which the thermally very severely stressed frictionally engaging components are subjected, especially when the clutch is slipping. To force the air to enter, it is provided preferably at one of the air through-openings 98, preferably at all of the air through-openings 98, that a front edge area 108, provided in the bottom area 90 and forming the boundary at the front, with respect to the direction d in which the clutch operates, is offset with respect to a rear edge area 110 forming the boundary at the rear of the respective air through-opening. The offset is such that the front edge area 108 is offset axially toward the interior 106 of the housing with respect to the rear edge area 110, at least at the exterior surface 112 of the housing, as is shown in FIG. 5. The bottom 90 has a bottom surface facing away from the interior, and none of the rear edges extends above the bottom surface.

FIG. 6 shows a sectional view of the group 104. It can be seen that there are three air through-opening 98, one behind the other in rotational direction d. In each case a web area 114 separates two of the openings 98. To force the air more strongly into the interior 106 of the housing through these various air through-openings 98, as can be seen especially clearly in FIG. 6, the edge areas 108, 110 are offset with respect to each other in the direction of the axis of rotation A. The edge area 108, which leads in rotational direction d, forms a boundary of one of the openings 98 and is closer to the interior 106 of the housing than the edge area 110, which trails the opening 98. This is done by providing a trough-like sunken area 116 in the area of the front edge, which can also be seen in FIG. 5. As a result, the level of the exterior surface 112 of the housing slopes down gradually toward the edge area 108 in the axial direction. As a result of this downslope of the exterior of the housing 112, a negative pressure is produced in the flow of air, as a result of which more air is sucked through the air through-openings 98. The edge areas 110 trailing the respective air through-openings 98 then act like turbine vanes and transport the air masses present in the area of the air through-openings 98 toward the interior of the housing 106.

It can be seen in FIG. 6 that the sunken areas 116 between two air through-openings 98 can be formed simply by slanting the webs 114. As a result of this slanted orientation, a surface 118 of these webs facing the interior of the housing will simultaneously be able to convey air like a turbine surface toward the inside.

It can also be seen in FIG. 6 that, in the case of the two webs 114 of the group 104 of air through-openings 98, the respective edge areas 110 lie axially on approximately the same level. Because, in the case of the web 114 leading in the rotational direction d, as also in the case of the trailing web 114, however, a surface 120 facing the exterior 112 of the housing is slanted in the same direction as the surface 118 of the web 114 to form the sunken area 116, it is again possible for the two edge areas 108, 110 to be offset with respect to each other in the manner described above in the case of the air through-opening 98 formed between two webs 114 and in the case of the air through-opening 98 following the second web 114.

Providing three groups 101, 102, 104, as shown especially in FIG. 5, produces a stronger air inflow into the interior of the housing around the entire circumference. The possibility is also created of designing the housing 14 in such a way that it is not balanced, that is, so that it would be out of balance when rotating. Only after the housing 14 has been assembled with other components, such as the components of the wear-compensating device 26 (e.g., the stop element 82 in FIG. 2), will an assembly be obtained which is perfectly balanced. There is no need for additional balancing weights on the housing.

Another advantage of the design of the housing 14 according to the invention is that the offsets between the various edge areas achieved by the slanting of certain surfaces can be produced without undercuts. This makes it possible for the housing according to the invention to be produced by casting.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A housing arrangement for a friction clutch having a direction of rotation about an axis, said housing arrangement comprising a housing in the form of a cup having a bottom transverse to said axis and a circumferential edge area defining an interior, said housing having at least one air through-opening in said bottom, each said through-opening being circumferentially closed and having a front edge and a rear edge with respect to said direction of rotation, said front edge being axially offset toward said interior with respect to said rear edge.

2. A housing arrangement as in claim 1 wherein said bottom has an exterior surface opposite from said interior, said exterior surface sloping down toward said interior at said front edge.

3. A housing arrangement as in claim 1 wherein said bottom has an interior surface facing said interior, said interior surface rising upward toward said rear edge.

4. A housing arrangement as in claim 1 comprising a plurality of said air through-openings distributed about said axis of rotation.

5. A housing arrangement as in claim 4 wherein said air through-openings are arranged in circumferentially spaced groups.

6. A housing arrangement as in claim 1 wherein said housing is cast metal.

7. A housing arrangement as in claim 1 wherein said housing is unbalanced prior to assembling other components to said housing.

8. A housing arrangement as in claim 4 wherein said bottom comprises a web separating said front edge of one of said openings from a rear edge of another one of said openings, said web having a surface facing said interior and a surface facing away from said interior, at least one of said surfaces being at an acute angle to a plane orthogonal to said axis of rotation.

9. A friction clutch having a direction of rotation about an axis, said friction clutch comprising a housing in the form of a cup having a bottom transverse to said axis and a circumferential edge area defining an interior, said housing having at least one air through-opening in said bottom, each said through-opening being circumferentially closed and having a front edge and a rear edge with respect to said direction of rotation, said front edge being axially offset toward said interior with respect to said rear edge.

10. A friction clutch as in claim 9 further comprising a plurality of clutch disks.

11. A friction clutch as in claim 9 wherein said bottom comprises a bottom surface facing away from said interior, each said rear edge not extending above said bottom surface.

12. A housing as in claim 1 wherein said bottom comprises a bottom surface facing away from said interior, each said rear edge not extending above said bottom surface.

* * * * *